Figure 1:
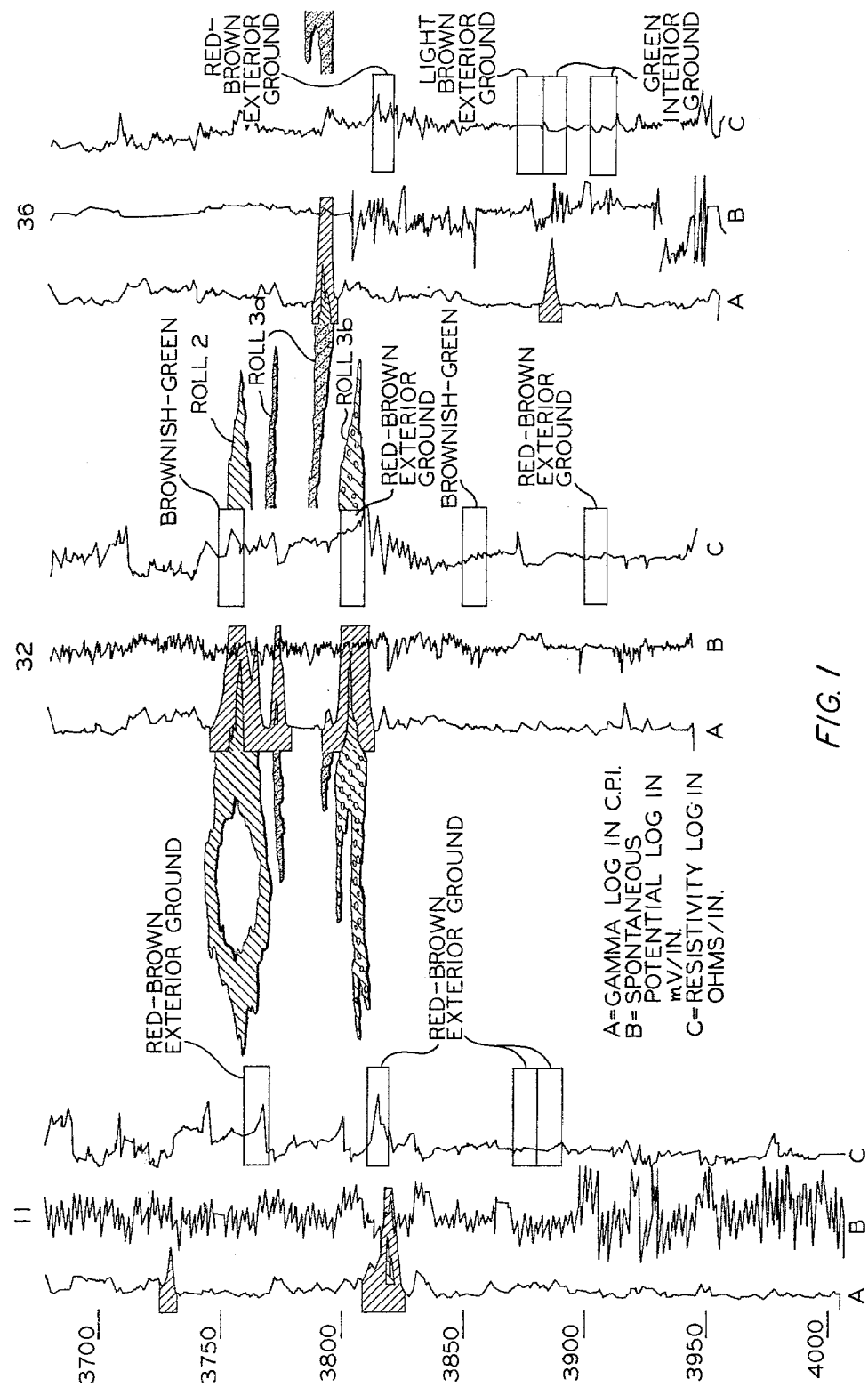

United States Patent [19]

Borst

[11] 4,324,555
[45] Apr. 13, 1982

[54] URANIUM EXPLORATION

[75] Inventor: Roger L. Borst, Bartlesville, Okla.

[73] Assignee: Phillips Petroleum Company, Bartlesville, Okla.

[21] Appl. No.: 163,661

[22] Filed: Jun. 27, 1980

[51] Int. Cl.³ .............................................. G01V 9/00
[52] U.S. Cl. ................................ 23/230 EP; 422/68
[58] Field of Search ............... 23/230 EP; 422/68, 55, 422/119

[56] References Cited

U.S. PATENT DOCUMENTS

| | | | |
|---|---|---|---|
| 2,319,734 | 5/1943 | Horvitz | 23/230 EP |
| 2,343,772 | 3/1944 | Horvitz | 23/230 EP |
| 2,348,639 | 5/1944 | O'Brien | 23/230 EP |
| 2,387,513 | 10/1945 | Hocott | 23/230 EP |
| 2,705,417 | 4/1955 | Romo et al. | 23/230 EP |
| 2,772,951 | 12/1956 | Bond | 23/230 EP |
| 2,889,208 | 6/1959 | Smith | 23/230 EP |
| 3,120,428 | 2/1964 | McDermott | 23/230 EP |
| 3,240,068 | 3/1966 | Horeth et al. | 23/230 EP |
| 3,957,438 | 5/1976 | Reid | 23/230 EP |
| 4,081,675 | 3/1978 | Bartz | 23/230 EP |

OTHER PUBLICATIONS

Rhett; Heavy Mineral Criteria for Subsurface Uranium Exploration, San Juan Basin, New Mexico; New Mexico Bureau of Mines & Mineral Resources, Memoir 38, 1980; pp. 202-207; Symposium held 5/13/79 to 5/16/79 in Albuquerque, New Mexico.
AAPG Bulletin, vol. 59, No. 5, p. 914 (1975).

Primary Examiner—Kenneth M. Schor

[57] ABSTRACT

The dominant clay mineral content of clay bearing sand samples from an underground uranium bearing formation is indicative of whether these samples have been taken from the exterior or the interior ground with respect to a uranium roll front. The analysis can readily be done by dye responsive color change analysis.

4 Claims, 2 Drawing Figures

URANIUM EXPLORATION

This invention relates to geochemical exploration. More specifically, the invention relates to prospecting for uranium ores using drill cutting analysis and drill core analysis.

BACKGROUND OF THE INVENTION

Various methods have been described in the art for prospecting for subsurface uranium deposits. Gamma-ray logging is one well known method. Another method involves the analysis of drill cutting samples for their content of Po-210. There is a continuous need in the industry for the development of fast, reliable and simple methods for analyzing drill cuttings in order to determine the location and/or shape of a uranium ore body.

THE INVENTION

It is one object of this invention to provide a new process for determining the position of an area of a formation with respect to a uranium roll front, a crudely crescent-shaped body with long trailing limbs. Said uranium ore deposit occurs within said roll front.

Another object of this invention is to provide a simple method for determining where a bore hole has been drilled with respect to a roll front or uranium ore body.

These and other objects, advantages, details, features and embodiments of this invention will become apparent to those skilled in the art from the following detailed description of the invention, the appended claims and the drawings which show a cross-section view of a formation with the exploration results obtained from three bore holes positioned at roughly the location of the hole drilled and with indications of the results obtained by the method of this invention.

area where a roll front has already passed through. The analysis therefore allows a determination of the direction where for instance a uranium ore body is located with respect to the location where the specific sample has been taken. The drill cuttings analysis always relates to samples from a known geographic location and a known depth.

Preferably, the analysis for montmorillonite is carried out and additionally the sample is analyzed for chlorite, kaolinite and illite contents or the contents of all minerals or combinations thereof previously established by cursory mineralogical analysis of the area of interest.

In the above mentioned example, montmorillonite is dominant in the barren exterior ground in the front of the uranium ore bodies. Chlorite is enriched in the ore zones and formed by the conversion of montmorillonite to chlorite at the time of uranium deposition. Kaolinite is enriched in the barren interior ground behind the ore bodies and is believed to be unrelated to the mineralization of uranium and is apparently formed later. Illite, a common clay mineral is not abundant in these strata.

The preferred method of analysis for montmorillonite is an organic dye color change analysis. In this method the sample is contacted with an organic dye to effect a color change of said sample, the clay mineral being that which changes color. This color change may result from simply contacting the clay mineral containing sample with the dye as in the case of methylene blue and benzidine or a further treatment such as a heat treatment as in the case of the triphenylmethane class of dyes may be necessary. Among the dyes useful for this test for montmorillonite, and other clay minerals the following preferred group is given: triphenylmethane class dyes (brilliant green), methylene blue and benzidine. The following tabulation lists the test procedure as well as the color change observed in the presence of montmorillonite, kaolinite, chlorite, and illite.

TABLE I

| | | COLOR CHANGE | | | | | | | |
|---|---|---|---|---|---|---|---|---|---|
| | | Montmorillonite | | Kaolinite | | Chlorite | | Illite | |
| DYE | TEST PROCEDURE | From | To | From | To | From | To | From | To |
| Triphenylmethane (Brilliant Green) | Mix with 0.025% aqueous dye solution at pH of 1-2; dry; heat | White to light Tan | Green (Rm Temp) Red (heated) | White | Green (Rm Temp) Green (heated) | Green | Green (Rm Temp) Green (heated) | Gray | Green (Rm Temp) Green (heated) |
| Methylene Blue | Mix with 0.001% aqueous dye solution at pH of 10; dry | White to light Tan | Blue-Green | White | Blue | Green | Blue | Gray | Olive-Green |
| Benzidine | Mix with 0.004% aqueous dye solution at pH of 7; add 1/5 ml $H_2O_2$; dry | White to light Tan | Red-Purple | White | Grayish-Purple | Green | Greenish-Gray | Gray | Grayish-Green |

REFERENCE TO PROCESS OF ANALYSIS ABOVE:
Mielenz, R. C., King, M. E.; and Schieltz, N. C.; 1950, Staining Tests. Section 6 in Analytical Data on Reference Clay Minerals, API Project 49, Preliminary Report No. 7, Columbia Univ. Page 135-160.

In accordance with this invention it has been found that the relative location of an underground mineralized clay sample with respect to a roll front can be readily determined by first analyzing a known sample for its dominant clay mineral and relating successive analyzed samples to the results of said known sample. For example, in a specific area it was found that a high montmorillonite content means that the sample has been taken from an area that is exterior ground whereas a low montmorillonite content indicates that the sample has been taken from an interior ground. An exterior ground is an area where the roll front has not yet passed through whereas an interior ground characterizes an The additional tests of the samples for chlorite, kaolinite, and illite which are preferred can be carried out in accordance with one of the previous methods.

The present invention utilizes the fact that the clay containing sands can be readily analyzed for their content of montmorillonite and one or more of the other minerals mentioned. It has been found that these minerals are uniquely indicative of whether the analyzed sample has come from an exterior or an interior region with respect to the roll front. However, it is not directly possible to relate the high montmorillonite content, for example, in all cases to the exterior or respectively the interior region. Therefore, for practical application of the invention it first has to be established or it has to be known whether a high montmorillonite content of a sample is indicative of the exterior or interior region with respect to roll front. Thus, in preparation of the geochemical exploration of this invention at least one sample has to be analyzed for its montmorillonite content or respectively the content of the other minerals and for that sample it has to be determined by other means whether the sample has been taken from an exterior or an interior region. These other methods are geochemical and geophysical methods and are as such well known in the art. Analysis for polonium, direct analysis for uranium where feasible, gamma logging, etc. are techniques that can be utilized for this purpose. Then once it has been established whether a high montmorillonite content relates to an exterior or interior region the fast and straight forward analysis for the minerals allows in an efficient and inexpensive way to determine the shape and location of the specific roll front one is interested in.

In accordance with a preferred embodiment of this invention the method for determining the type of the clay mineral sample described above is used in a prospecting process. In this embodiment of the invention a uranium prospecting process or method is provided for. In this method, one or more holes are drilled through a formation. From these holes one or more samples containing clay minerals are obtained. Each of these samples is subjected to the mineral analysis described; specifically the samples are analyzed for their mineral content, montmorillonite being preferred. Responsive to the result of this analysis, one or more further holes are drilled through the formation and properties indicative of the shape and/or location of a uranium body are measured for the further hole or for these further holes. Thus, the determination of a high montmorillonite content in the above example being indicative of this sample being taken from a predetermined exterior area of the formation allows the prospector to drill a further hole toward the roll front thereby allowing a determination whether this new hole with respect to the specific strata envisaged is still exterior of the uranium body, is in the uranium body or has "overshot" and is now interior of the uranium body.

Modern prospecting methods usually do not rely upon one single prospecting method. It is therefore preferred in accordance with this invention, too, to carry out at least one additional prospecting method to determine the nature of the formation of a given bore hole. The preferred additional prospecting method to be carried out is electric logging. This prospecting process is well known in the art and is described in detail for instance in "Applied Mineral Exploration With Special Reference to Uranium", by Robert V. Bailey and Milton O. Childers, 1977, pages 394–415. The description of this method is incorporated into this specification by reference.

The following examples and the description of the drawings are intended to illustrate the invention in more detail without undue limitations of its scope.

EXAMPLE I

Washed and crushed samples from selected holes from a Uranium Prospecting Project were used for dye testing. The choice of holes was dictated by availability of the cuttings in each area, as not all holes in a given area were sampled. Most of the drill cuttings were divided into 10 foot increments by the sample washer. An attempt was made to correlate the samples to the electric log, but in some cases this was not possible, sample quality was poor in some instances and some samples were found to be unsuitable; in such cases alternate holes were used. Adequate care needs to be used in obtaining said samples. Major sand units in canyons were also sampled and tested if samples were found to represent formation sands.

About $\frac{1}{4}$ gram of sample was put into a test tube. Then 4–5 drops of a 0.025% aqueous triphenylmethane solution was added. The test tube was swirled to mix the cuttings and solution and placed on a heat block for 45 minutes to heat the test tubes. This setting allows the solution to gently boil but not splatter onto the sides of the test tubes. The resultant color was only accurate if the residue was completely dry and warm.

Cores from one interior hole and one exterior hole were sampled. The interior sample contained a small amount of $CaCo_3$, whereas the exterior had none visibly present. A dull, deep aqua-green color, indicative of oxidized ground, resulted from testing the sample from the interior hole after heating. The exterior sample turned a dark red-brown after heating indicative of reduced ground.

EXAMPLE 2

Samples from two cross sections (FIG. 1) through selected areas were tested first to establish the color scale and test the accuracy of the method. These two sections are about 8 miles from one another, located as shown in FIG. 2. The holes were picked so that they traversed inferred roll fronts from interior to exterior ground.

COLOR SCALE

Numbers 1, 2, 3, 4, 5 were chosen to correlate the resultant colors in the test tubes as shown in the following tabulation. Interior and exterior are used to mean oxidized and reduced ground respectively:
1: Deep Aqua Green-Interior
2: Green-either a mixture of light and dark or dull green
3: Questionable brownish green or greenish brown
4: Light brown, brown light reddish brown
5: Red brown-Exterior Colors 1 and 5 were unmistakable. Anything unidentifiable was put in category 3 and gives no accurate information concerning the relative location of the respective interval from which the sample has been taken. There was more gradation of color from 4–5 than from 1–2. Therefore, when the color was red brown but slightly lighter in color than 5, an intermediate characterization between 4 and 5 was used.

In the following table the results of only a few samples from a large number that have been run are shown. The results shown relate to the test holes illustrated and labelled in FIGS. 1 and 2.

| | TEST RESULTS | | | | | |
|---|---|---|---|---|---|---|
| | | Interior Ground | | | Exterior Ground | |
| Drill Hole No. | Interval Sampled (feet below surface) | 1 | 2 | 3 | 4 | 5 |
| 11 | 3770–80 | | | | X | |
| | 3810–20 | | X | | | |
| | 3820–30 | | | X | | |
| | 3890–3900 | | | | X | |
| | 3920–30 | | | | | X |

| Drill Hole No. | Interval Sampled (feet below surface) | Interior Ground 1 | 2 | 3 | Exterior Ground 4 | 5 |
|---|---|---|---|---|---|---|
|  | 3940-50 |  |  |  | X |  |
|  | 3820-30 |  |  |  | X |  |
|  | 3880-90 |  |  |  |  | X |
|  | 3890-3900 |  |  |  |  | X |
| 36 | 3810-20 | X |  |  |  |  |
|  | 3820-30 |  |  |  | X |  |
|  | 3880-90 |  |  |  | X |  |
|  | 3890-3900 | X |  |  |  |  |
| 32 | 3750-60 |  | X |  |  |  |
|  | 3800-10 |  |  |  |  | X |
|  | 3850-60 |  |  | X |  |  |
|  | 3900-10 |  |  |  | X |  |

Figure 2:
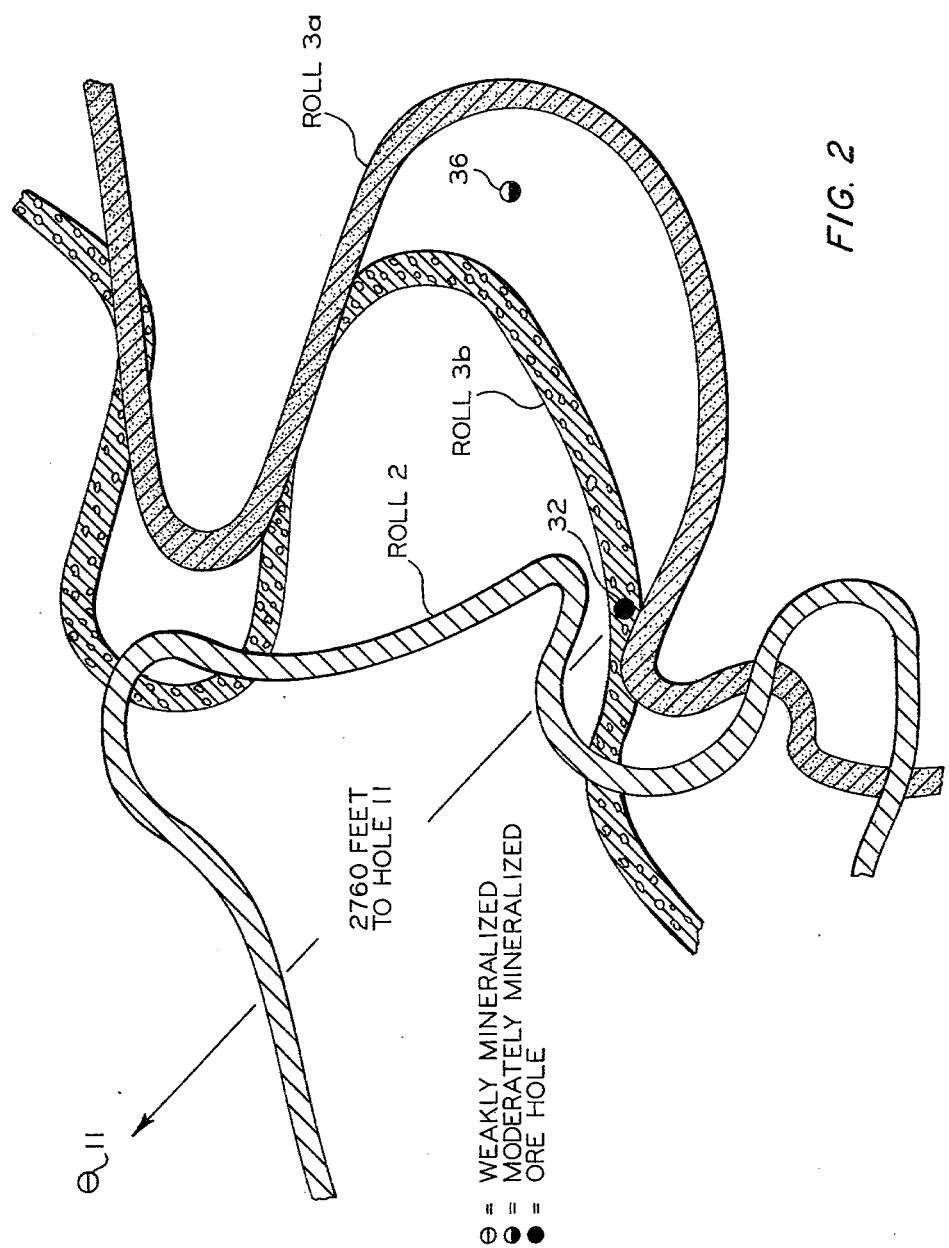

FIG. 1 schematically shows a two dimensional cross sectional view through a formation with three bore holes 11, 32, and 36. As can be seen from FIG. 2 these bore holes are not arranged in one plane but the cross sectional view for simplicity reasons has been shown in FIG. 1 as folded into one plane. As can be seen from FIGS. 1 and 2 three different roll fronts or ore bodies are envisaged in these figures. The top view and the cross sectional view in both figures show the individual roll front hatched in the same way. Hole 11 represents a weakly mineralized bore hole, hole 36 represents a moderately mineralized bore hole and hole 32 refers to an ore hole.

In FIG. 1 the measurements of 3 other test methods under the electric logging guidelines as referenced which were carried out in the bore holes are shown, namely a gamma logging, spontaneous potential logging and resistivity logging which determines the electrical resistance of the formation. The logging results are self explanatory to persons skilled in the art. In the FIG. 1 the roll fronts have been hatched to distinguish between roll fronts of different depths in FIG. 2. Specific colors of the samples tested are indicated in accordance with the process of this invention. It can be seen from these results that the tested samples adequately reflect the location of the sample cuttings with respect to the ore body and that the results correlate reasonably well with the other test methods.

Reasonable variation and modifications which will become apparent to those skilled in the art can be made in this invention without departing from the spirit and scope thereof.

I claim:

1. Process for prospecting for uranium roll front deposits comprising
   (a) establishing a relationship between the clay content of samples from a formation, said clay content being determined for one or more clays selected from the group of montmorillonite, chlorite, kaolinite and illite, and the relative location of the underground origin of such samples with respect to a uranium roll front in said formation, where the establishing is done by determining clay content for each sample and recording whether the sample for which the clay is determined is an interior, uranium roll front, or exterior sample,
   (b) drilling at least one first hole through said formation,
   (c) obtaining one or more clay-bearing samples from the so drilled hole or holes,
   (d) analyzing said sample or samples obtained in step (c) for the content of said clay or clays for which said relationship has been established in step (a), and characterizing the samples so analyzed as to their relative positions with respect to a roll front in the formation by said relationship,
   (e) drilling at least one second hole through the formation, the geographic location of which is determined from said characterizing of said samples in step (d), and analyzing one or more samples from the second hole, in order to determine the location and/or shape of a uranium bearing formation.

2. Process in accordance with claim 1 wherein said analysis is carried out by contacting said sample with an organic dye with or without further treatment of the dye contacted sample and utilizing a color change or its absence as the analysis result.

3. Process in accordance with claim 2 wherein said dye is selected from the group consisting of the triphenylmethane class (brilliant green), methylene blue, benzidine derived dyes.

4. Process in accordance with claim 1 comprising carrying out an electric logging analysis in one or more of said first holes and
   responsive to the results obtained in the said clay analysis and in the electric logging analysis carrying out the drilling of the second hole or holes.

* * * * *